(12) United States Patent
Wiebe et al.

(10) Patent No.: US 7,144,070 B2
(45) Date of Patent: Dec. 5, 2006

(54) COMBINATION MULTIPURPOSE TRAILER AND ROOFTOP STORAGE CONTAINER AND METHOD THEREFOR

(76) Inventors: Michael Wiebe, 40516 N. Cross Timbers Trail, Anthem, AZ (US) 85086; Scott Foreman, 40319 N. Justice Way, Anthem, AZ (US) 85086

( * ) Notice: Subject to any disclaimer, the term of this patent is extended or adjusted under 35 U.S.C. 154(b) by 110 days.

(21) Appl. No.: 11/032,042

(22) Filed: Jan. 7, 2005

(65) Prior Publication Data

US 2006/0152040 A1    Jul. 13, 2006

(51) Int. Cl.
*B62D 25/06* (2006.01)
(52) U.S. Cl. .................. 296/185.1; 296/183.1
(58) Field of Classification Search ............ 296/185.1, 296/37.7, 163, 167
See application file for complete search history.

(56) References Cited

U.S. PATENT DOCUMENTS

| | | | | |
|---|---|---|---|---|
| 3,784,230 A * | 1/1974 | Worrall, Jr. .............. 280/415.1 |
| 4,261,613 A * | 4/1981 | Alford ...................... 296/165 |
| 4,310,195 A * | 1/1982 | Huff .......................... 296/173 |
| 4,372,568 A * | 2/1983 | Campbell ................... 296/173 |
| 4,378,898 A * | 4/1983 | Smeenge et al. ........... 224/328 |
| 4,417,765 A * | 11/1983 | Wirsbinski ............... 296/183.2 |
| 4,579,382 A * | 4/1986 | Lake ........................ 296/183.1 |
| 4,645,230 A * | 2/1987 | Hammons .................. 280/656 |
| 4,786,073 A * | 11/1988 | Harper ...................... 280/656 |
| D318,841 S * | 8/1991 | Lemire ...................... D12/102 |
| 5,308,096 A * | 5/1994 | Smith ........................ 224/415 |
| 6,082,809 A * | 7/2000 | Edgeller et al. ......... 296/181.3 |
| 6,634,701 B1* | 10/2003 | Votruba et al. .......... 296/182.1 |
| 6,910,609 B1* | 6/2005 | Williams et al. ............ 224/519 |
| D507,208 S * | 7/2005 | Ulch ........................ D12/102 |
| 6,991,250 B1* | 1/2006 | Lindsey et al. ............. 280/651 |
| 2005/0145662 A1* | 7/2005 | Williams et al. ............ 224/519 |

* cited by examiner

*Primary Examiner*—Kiran B. Patel
(74) *Attorney, Agent, or Firm*—Jeffrey D. Moy; Harry M. Weiss; Weiss & Moy, P.C.

(57) ABSTRACT

A combination trailer and rooftop carrier for transporting objects has a frame having an axle and wheel assembly. The frame has a trailer hitch to couple the frame to a vehicle. A main storage compartment is coupled to the frame and axle wheel assembly. A lid assembly is removably coupled to the main storage compartment wherein the lid assembly may be removed and coupled to a roof top mounting rack on a vehicle to form the rooftop carrier.

20 Claims, 6 Drawing Sheets

COMBINATION MULTIPURPOSE TRAILER AND ROOFTOP STORAGE CONTAINER AND METHOD THEREFOR

BACKGROUND OF THE INVENTION

1. Field of the Invention

This invention relates generally to trailers, and more specifically, to a multipurpose trailer for transporting sporting and outdoor equipment, as well as other equipment to a desired destination. The multipurpose trailer can be partially disassembled and mounted to a roof of a vehicle for transporting equipment to a desired location when towing of a trailer unit is undesirable or unnecessary. The multipurpose trailer can also be converted as an open trailer behind the vehicle while the rooftop unit is fully enclosed.

2. Description of the Prior Art

Many people like to enjoy doing outdoor activities such as biking, camping, kayaking, and the like. Unfortunately, these activities, as well as many other outdoor activities, require the use of large and bulky equipment. Transporting this equipment to a desired location is often difficult. Thus, many people do not participate in outdoor activities as often as they would like to due to the problems of transporting the equipment.

An example of the problem of transporting sporting equipment is the need to transport bicycles to a desired location, such as a vacation site, tour site, trail site, race, or other location. Transporting a bicycle typically requires either carrying the bicycle in a trunk, bed, or backseat of the vehicle or else the use of a carrier of some sort, such as a car top carrier, trunk mounted carrier or receiver mounted carrier. All of the above have certain problems associated with them.

The use of the interior or trunk of the vehicle to transport the equipment creates a number of problems. For instance the lack of available space can be particularly a problem when there are several individuals with their associated equipment involved, especially if there is any significant distance to be traveled. If the interior of the vehicle is used, the view of the driver can easily be obstructed by the equipment. There is also a problem associated with damage to the equipment since the vehicle's interior is seldom designed to accommodate such equipment. The security of the equipment is also an issue when the vehicle is left unattended, particularly overnight, since it is normally noticeable through the windows of the vehicle. Furthermore, bicycles can get fairly dirty during use. This is especially true if one is going mountain biking. Many people do not wish to place a dirty bicycle in the interior of the vehicle.

Exterior carriers also have many problems associated with them. Exterior carriers tend to be either the modular component carriers which use racks on the vehicle top, rear or on the receiver, or else the "box-type" carriers which are essentially cargo boxes mounted on the rooftop. These carriers are cumbersome and create significant aerodynamic problems. The security of such devices is also questionable when the vehicle is left unattended. Also, the equipment is normally uncovered and susceptible to damage from the elements. Another problem with these carriers is the lack of accessibility to the equipment.

Many people use trailers for transporting equipment to a desired location. However, present prior art trailers also have several drawbacks. Many prior trailers are designed as open space containers. Thus, there is a security issue that items placed in the trailer may fall out or be wrongly taken out of the trailer. Furthermore, most prior art trailers are not designed to hold specific items such as a bicycle, kayak, or the like. As stated above, many prior art trailers are open space containers where items are just placed in the open container. Also, present trailers tended to be boxy and relatively heavy. Some trailers do have a removable top, but the tops tend to be cumbersome and difficult to use. Prior art trailers also do not have many accessories or modern conveniences that many people desire.

Therefore, there is a need for an improved trailer. The improved trailer will overcome the problems associated with prior art trailer. The improved trailer will be multi-dimensional in that the trailer can be pulled behind or mounted on top of the vehicle. The improved trailer is designed to accommodate large and bulky sporting equipment. The improved trailer will be able to securely hold the equipment in order to prevent theft of the sporting equipment or any other items stored in the trailer. The improved trailer will have a plurality of accessories and modern conveniences that many people desire.

SUMMARY OF THE INVENTION

In accordance with one embodiment of the present invention, it is an object of the present invention to provide an improved trailer.

It is another object of the present invention to provide an improved trailer that will overcome the problems associated with prior art trailers.

It is still another object of the present invention to provide an improved trailer that will be multi-dimensional in that the trailer can be pulled behind, mounted on top of a vehicle or converted as an open trailer behind the vehicle while the rooftop unit is fully enclosed.

It is still another object of the present invention to provide an improved trailer that is designed to accommodate large and bulky sporting equipment.

It is still another object of the present invention to provide an improved trailer that will be able to securely hold the equipment in the trailer in order to prevent theft or damage of the equipment or any other items stored in the trailer.

It is still another object of the present invention to provide an improved trailer that will have a plurality of accessories and modern conveniences that many people desire.

BRIEF DESCRIPTION OF THE EMBODIMENTS

In accordance with one embodiment of the present invention, a combination trailer and rooftop carrier for transporting objects is disclosed. The combination trailer and rooftop carrier has a frame having an axle and wheel assembly. The frame has a trailer hitch to couple the frame to a vehicle. A main storage compartment is coupled to the frame and axle wheel assembly. A lid assembly is removably coupled to the main storage compartment wherein the lid assembly may be removed and coupled to a roof top mounting rack on a vehicle to form the rooftop carrier.

In accordance with another embodiment of the present invention, a combination trailer and rooftop carrier for transporting objects is disclosed. The combination trailer and rooftop carrier has a frame having an axle and wheel assembly. The frame comprises a plurality of a plurality of tubular members coupled to the axle assembly. A trailer hitch is couple to a front section of the frame to couple the trailer to a vehicle. A main storage compartment is coupled to the frame and axle wheel assembly. The main storage compartment has a floor board having an approximately planer surface wherein the floor board is coupled to the frame at an angle to allow a liquid to drain off the floor board. A plurality of walls extends up from the outer perimeter of the floor board to form an enclosure having an open top section. A lid assembly is removably coupled to the main storage compartment. The lid assembly may be removed and coupled to a roof top mounting rack on a vehicle to form the rooftop carrier. The lid assembly has a lip member running along an outer perimeter of the main compartment body on the top of each wall. The lip member is removably coupled to each wall. A shell top is hingely coupled to the lip member to raise the shell top to open and close the lid assembly. The shell top has a roof board having an approximately planer surface wherein a front exterior section of the roof board is angled and edges rounded to form an aerodynamic shell top. A plurality of shell top walls extends down from the outer perimeter of the roof board to form an enclosure having an open bottom section. The shell top enclosure in combination with the main storage compartment enclosure forms a hollow interior section for the main compartment body having a depth to store large equipment. A pair of lift members is coupled to the shell top and an interior surface of the main storage compartment for raising the shell top and preventing the shell top from free falling downward.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

DETAILED DESCRIPTION OF THE PREFERRED EMBODIMENT

Referring now to the Figures, wherein like numerals and symbols represent like elements, an improved trailer 10 (hereinafter trailer 10) is shown. The improved trailer 10 is designed to be towed behind a vehicle. Alternatively, the trailer 10 may be partially disassembled so that sections of the trailer 10 may be mounted on a roof of a vehicle to form a rooftop storage container 12. The trailer 10 and rooftop storage container 12 can each securely store items in their respective interior compartments.

The trailer 10 has a frame member 14. The frame member 14 is used to support and move the cargo containing compartment 10A of the trailer 10. The frame member 14 is generally made out of a plurality of tubular members 14A. The tubular members 14A are made out of a strong light weight metal. In accordance with one embodiment of the present invention, the tubular members 14A are coupled together in an A-frame configuration. Any type of frame configuration may be used without departing from the spirit and scope of the present invention. At the top of the frame member 14 is a hitch assembly 14B. The hitch assembly 14B is used to couple the trailer 10 to the rear of a vehicle.

Figure 6:
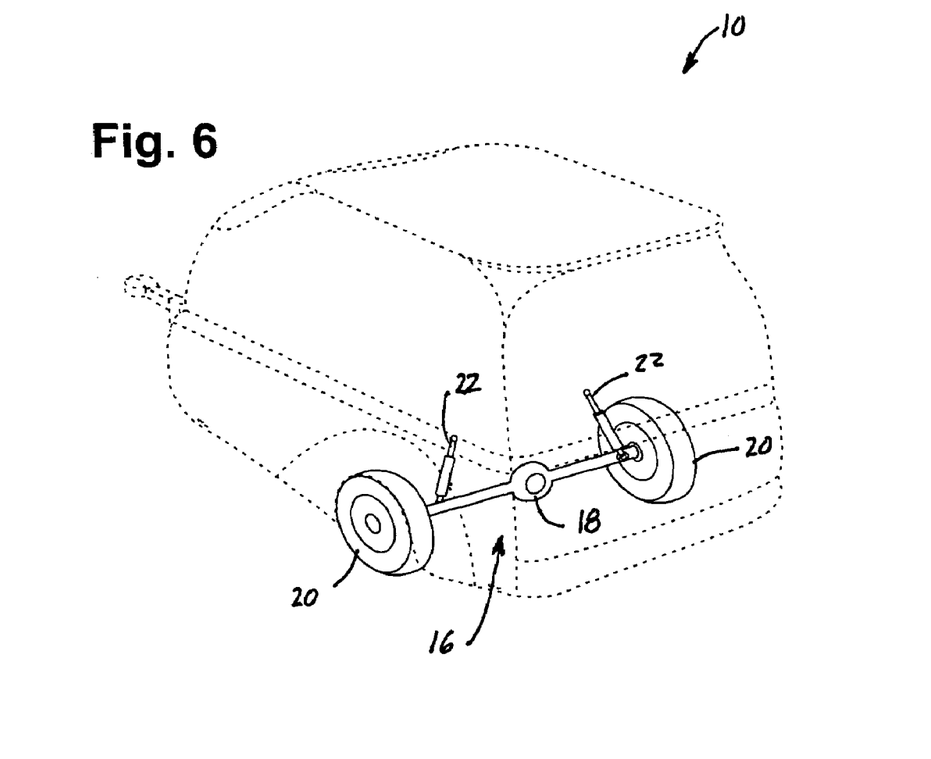
FIG. 6 is an elevated rear perspective view of the improved trailer showing the shock system.

The frame member 14 has an axle assembly 16 coupled thereto. The axle assembly 16 has an axle 18. A pair of wheels 20 is rotatably coupled to each end of the axle 18. The rotation of the pair of wheels 20 allows the frame member 14 to move. A pair of shock absorbers 22 is coupled to the axle 18. The shock absorbers 22 are used to absorb mechanical shocks to dampen the jarring sustained during movement of the trailer 10.

Coupled to the frame member 14 is the cargo containing compartment 10A. The cargo containing compartment 10A has a main compartment body 24. The main compartment body 24 is generally made out of a durable but lightweight material such a plastic, polyurethane, fiberglass, or the like. A lightweight metal such as aluminum or the like may also be used. If a metal is used, the main compartment body 24 may further be coated or lined similar to a truckbed liner. The coating or lining will be a weather resistant coating that will provide an ease in cleaning the main body compartment 24.

The main compartment body 24 will have a floor section 26. The floor section 26 will have a contoured surface which is slightly angled to allow any moisture that may get into the main compartment body 24 to drain out of drainage holes 28. In accordance with one embodiment of the present invention, a pair of wheel wells 30 may rise up from the floor section 26. The wheel wells 30 will allow the trailer 10 to have a lower profile thereby reducing aerodynamic drag when being pulled behind a vehicle.

Walls 32 will extend up from the outer perimeter of the floor section 26 on each side to form an enclosure having an open top section. The height of the walls 32 may vary. In general, the walls 32 should be of sufficient height to store items within the interior of the main compartment body 24 so that the items will not fall out of the main compartment body 24 if the main compartment body 24 is left with an open top section and is being towed by a vehicle.

In accordance with one embodiment of the present invention, a rear wall 32A is movably coupled to the floor section 26. The rear wall 32A may be hinged to the floor section 26. This will allow the rear wall 32A to be folded down to help unload large items from the trailer 10 such as a motorcycle or the like. In this embodiment, a locking device (not shown) would need to be used to keep the rear wall 32A in an up and locked position. A handle member 33 may be formed in the rear wall 32A. The handle member 33 may be used to unlock the rear wall 32A and to help lower the rear wall 32A.

In accordance with another embodiment of the present invention, the rear wall 32A may have an extension member.

The extension member would be formed inside the rear wall 32A and would be able to extend out from the rear wall 32A when the rear wall 32A is lowered. Once pulled out, the extension member would form a ramp member to help unload objects from the trailer. Alternatively, the rear wall 32A may be movably coupled to the floor section 26 so that the rear wall 32A will move in an up and down motion to help load and unload objects. Some type of hydraulics, pneumatics, of the like may be used to raise and lower the rear wall 32A.

Figure 2:
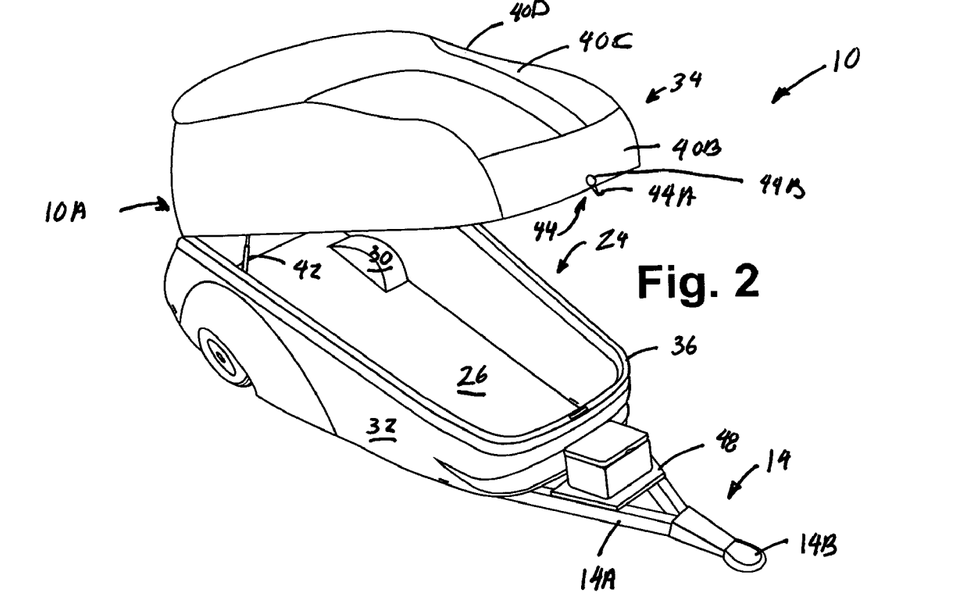
FIG. 2 is an elevated perspective view of the improved trailer of the present invention with the lid in an open position.
Figure 2A:
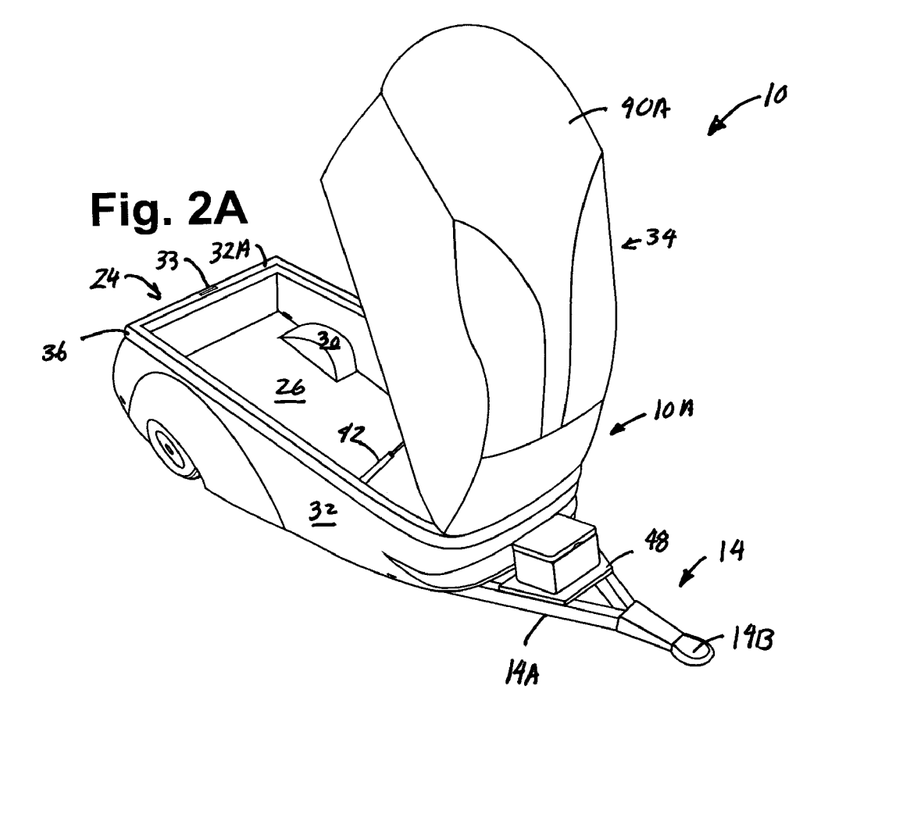
FIG. 2A is an elevated perspective view of the improved trailer of the present invention with the lid in an alternative open position.

A lid assembly 34 is removably coupled to the main compartment body 24. The lid assembly 34 allows one to raise and lower the lid assembly 34 in order to safely store and retrieve objects placed in the trailer 10. The lid assembly 34 is hinged to one end of the main compartment body 24. As shown in FIGS. 2 and 2A, the lid assembly 34 may be hinged to either the front or rear of the main compartment body 24.

The lid assembly 34 has a lip member 36. The lip member 36 runs along the outer perimeter of the main compartment body 24 on the top of each wall 32. The lip member 36 is removably coupled to the main compartment body 24. The lip member 36 is generally made out of the same material as the main compartment body 24. The listing of the different materials should not be seen as to limit the scope of the present invention.

Figure 4:
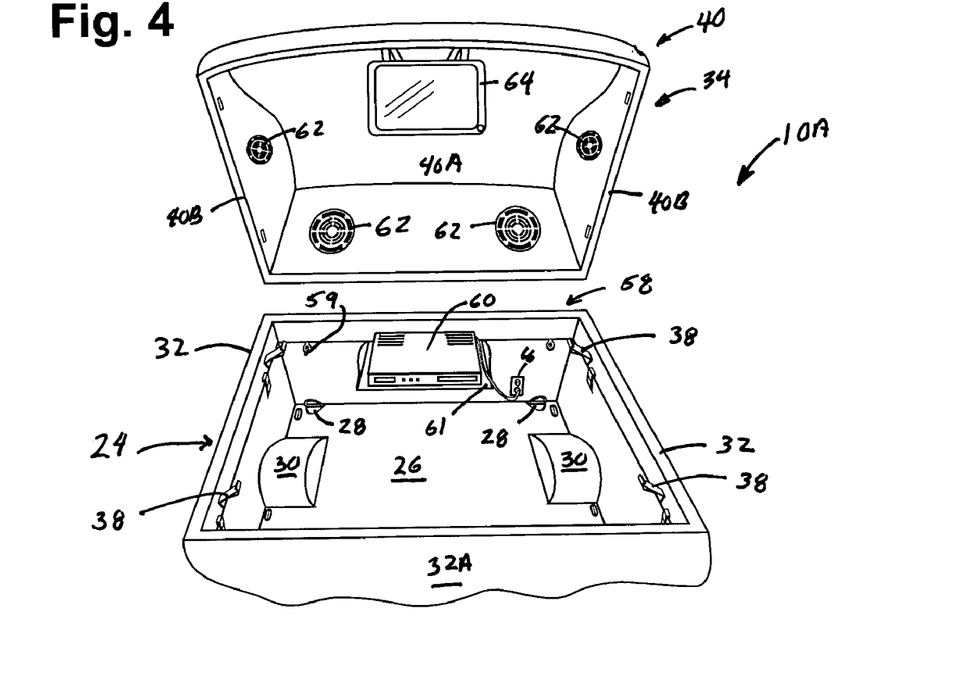
FIG. 4 is an elevated front view of the interior of the improved trailer of the present invention.

The lip member 36 is coupled to the top of each wall 32 by a plurality of coupling devices 38 (FIG. 4). The coupling devices 38 allow one to remove the lid assembly 34 and place the lid assembly 34 on top of the roof of the vehicle to form the rooftop storage container 12 which will be discussed below. The coupling devices 38 are generally a plurality of latches. One end of each latch is coupled to interior section of the wall 32. The other end of each latch is used to secure the lip member 36 to the top of the wall 32.

The lid assembly 34 also has a shell top 40 hinged to the lip member 36. The shell top 40 is hinged to one side of the lip member 36 to allow one to raise and lower the shell top 40 in order to safely store and retrieve objects placed in the trailer 10. The shell top 40 may be hinged to either the front or rear of the lip member 36 (See FIGS. 2 and 2A).

The shell top 40 will have a roof panel 40A. Walls 40B will extend down from the outer perimeter of the roof panel 40A to form an enclosure having an open bottom section. The height of the walls 40B may vary. In general, the walls 40B should be of sufficient height to allow the storage of bulky equipment within the main compartment body 24. Thus, the height of walls 40B in combination with the height of walls 32 will form a hollow interior section for the main compartment body 24. The hollow interior is of sufficient depth to store large equipment like bikes and the like. The hollow interior will have a depth of approximately 3–5 feet.

The front exterior section 40C of the shell top 40 will have a slight slope. Also, the edges 40D along the top exterior surface of the shell top 40 will be rounded. The slope in the front exterior section 40C of the shell top 40 and the rounded edges have two benefits. First, the slope and the rounded edges 40D will prevent water and other debris from gathering on top of the shell top 40. Second, the slope and the rounded edges 40D will reduce wind drag thereby providing an aerodynamic feature to the trailer 10.

The lid assembly 34 will further have a pair of lift supports 42. The lift supports 42 are coupled to the interior of the main compartment body 24 and to the interior of the shell top 40. The lift supports 42 are used to raise and hold the shell top 40 in an open position and to prevent the shell top 40 from free falling down when lowering the shell top 40. The lift supports 42 are generally gas charged lift supports. However, other types of lift supports 42 may be used without departing from the spirit and scope of the present invention.

A locking mechanism 44 is used to secure the shell top 40 in a closed position. The locking mechanism 44 is placed on the end of the shell top 40 that is being raised. Thus, in FIG. 2, the locking mechanism 44 is in the front section of the shell top 40. In FIG. 2A, the locking mechanism 44 is placed on the rear section of the shell top 40. In accordance with one embodiment of the present invention, the locking mechanism 44 will have a latch 44A. The latch 44A will extend down into the interior of the wall 36 thereby locking the shell top 40 in a closed position. A key slot 44B may be used to lock and unlock the latch 44A. It should be noted that other types of locking mechanisms 44 may be used without departing from the spirit and scope of the present invention.

The trailer 10 has a plurality of lights 46 located on the exterior of the main compartment body 24. The trailer 10 will have at least two rear lights 46A and a plurality of different side lights 46B. The lights 46 will be wired to the vehicle to signal when the vehicle is braking, turning, and the like.

The trailer 10 has a front platform 48. The front platform 48 is coupled directly to the frame member 14. The front platform 48 is used to hold additional items on the trailer 10. For example, as shown in FIG. 2A, an ice chest or other items may be placed on the front of the trailer 10. Bungee cord, rope or other devices may be used to secure items to the platform 48.

Figure 1:
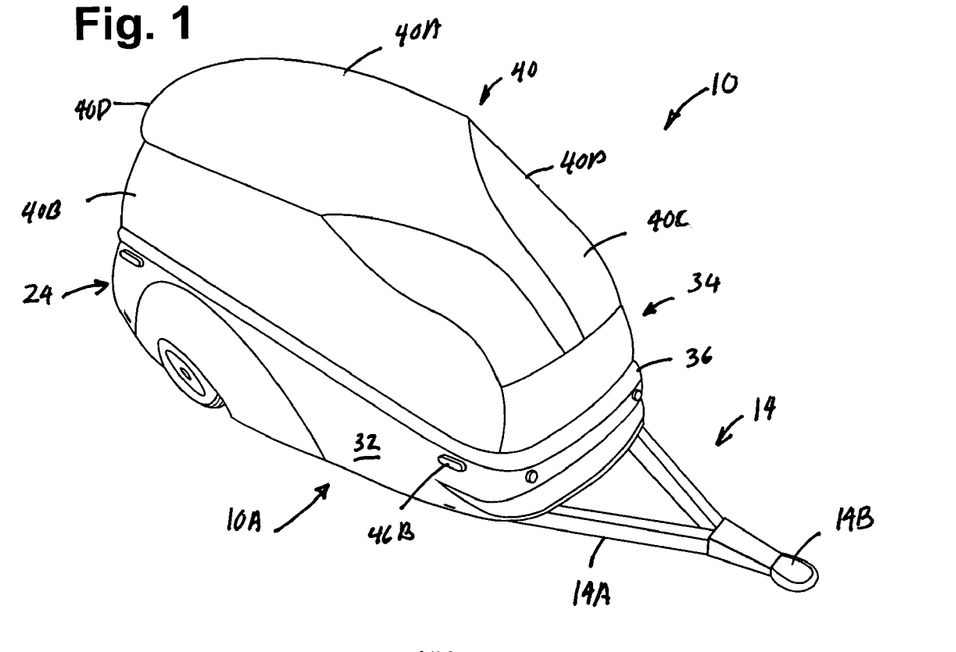
FIG. 1 is an elevated perspective view of the improved trailer of the present invention in use.
Figure 1A:
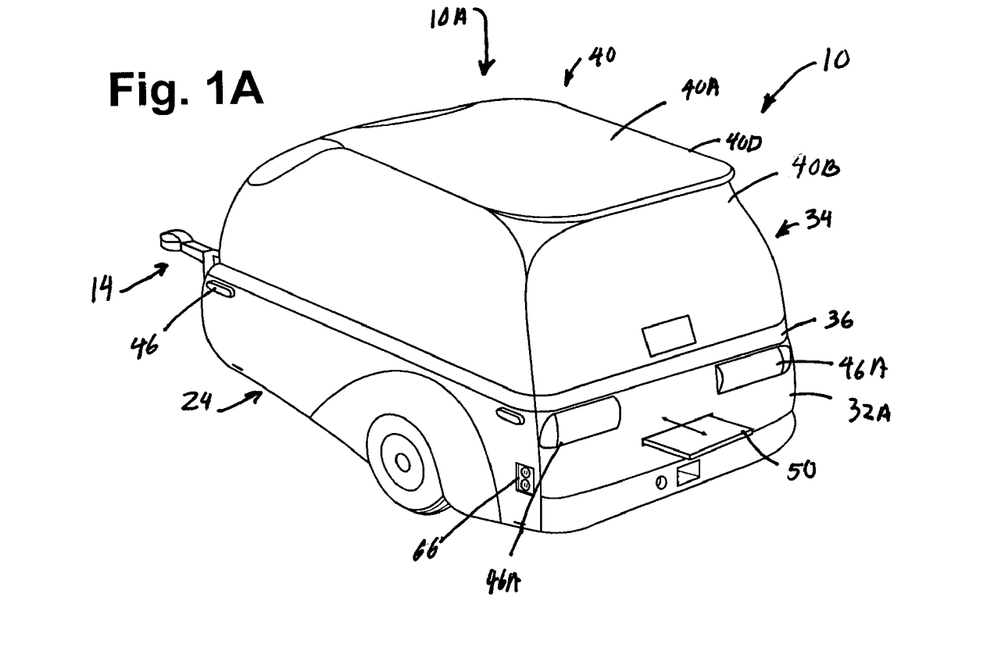
FIG. 1A is an elevated perspective view showing the rear section of the improved trailer of the present invention.

In the rear of the trailer 10, a retractable tray 50 (See FIG. 1A) is formed in the rear wall 32A. The retractable tray 50 may be slid out to form a table for holding items. When not in use, the retractable tray 50 may be slid back into the rear wall 32A for storage.

Figure 3:
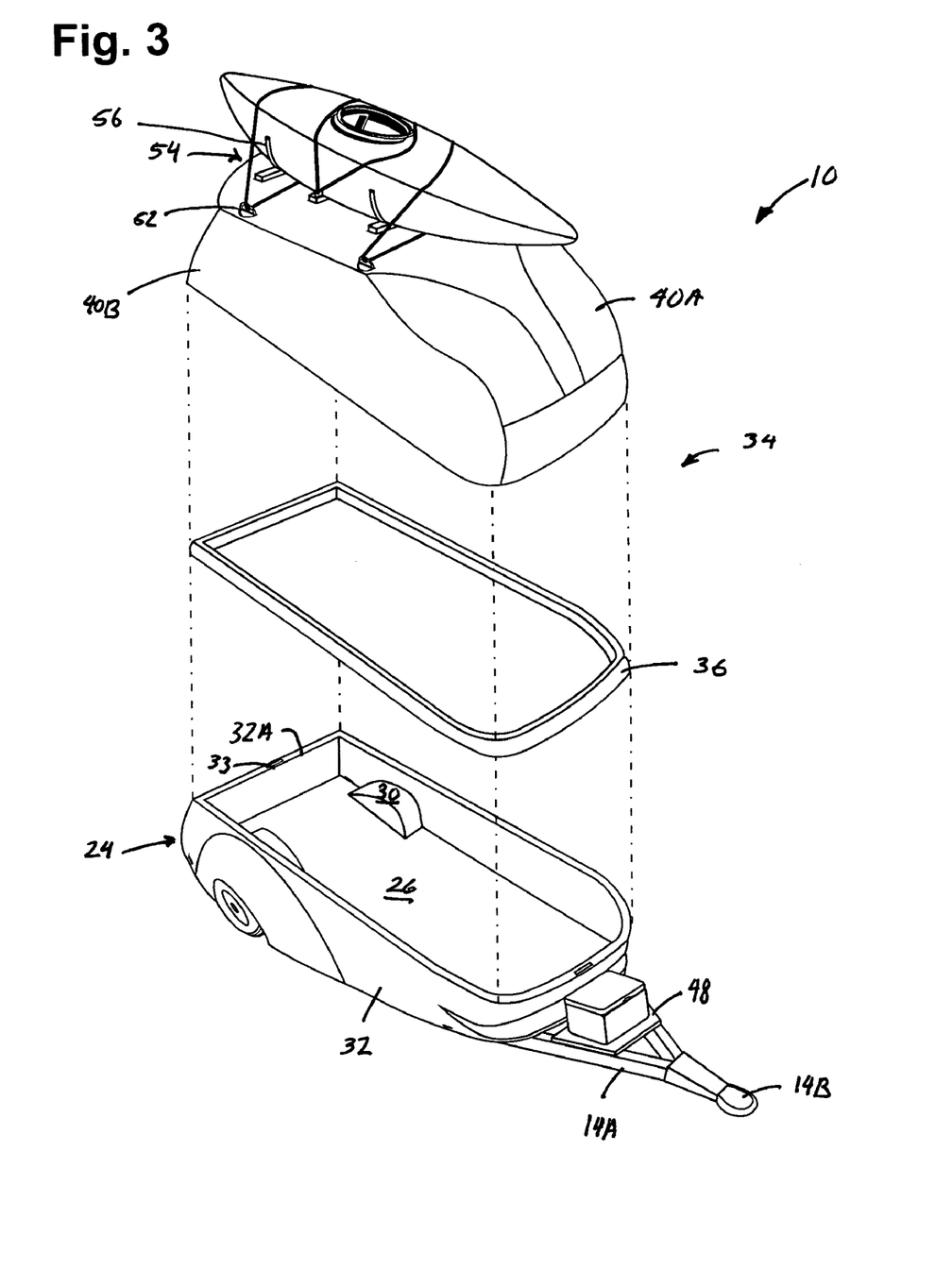
FIG. 3 is an exploded view of the improved trailer of the present invention holding a kayak.

On the top exterior surface of the shell top 40 is a plurality of D-rings 52 (See FIG. 3). The D-rings 52 are coupled to the exterior surface of the shell top 40 along the outer perimeter. The D-rings 52 are used to tie down objects on top of the trailer 10. In order to prevent damage to the exterior surface of the shell top 40, a rooftop rack 54 may be coupled to the top exterior surface of the shell top 40. The rooftop rack 54 will allow large objects like a kayak shown in FIG. 3 to be stored on top of the shell top 40 and not scratch and damage the exterior surface. The rooftop rack 54 may have a plurality of clamping devices 56 coupled to the rooftop rack 54. The clamping device 56 will hold objects to the rooftop rack 54 so that roping is not required.

The interior of the trailer 10 will have a plurality of accessories and modern conveniences that many people desire. The interior of the trailer 10 will have an entertainment system 58. The entertainment system 58 has a main control unit 60. The main control unit 60 may be an AM/FM radio receiver, an audio tape player, a VCR player, a CD/DVD player, a TV receiver, a gaming counsel, or the like. The main control unit 60 may also be any combination of the above. The listing of the above should not be seen as to limit the scope of the present invention. The main control unit 60 is placed on a mounting table 61. The mounting table 61 is foldably coupled to the interior of the main compartment body 24. The mounting table 61 may be used to hold other items besides the main control unit 60 as disclosed above. The mounting table may even be used as a table to write or eat upon.

A plurality of speakers 62 are coupled to the main control unit 60. The speakers 62 are used to disseminate any audio signal from the main control unit 60. A video monitor 64 may also be coupled to the main control unit 60. The video monitor 64 is used to display any video signal transmitted by the main control unit 60. The video monitor 64 may be a standard CRT monitor or the like. Preferably, the video monitor 64 is a flat panel display. The flat panel display may be a plasma screen, a Liquid Crystal Display (LCD), a thin film electroluminescent display (TFEL), or the like. In general, a flat panel display is used since flat panel displays are lighter in weight and maybe easily mounted on the shell top 40. Flat panel displays also tend to take up less space than a CRT monitor and the like.

The interior of the trailer 10 will also have a plurality of connectors 59 located on the interior of the walls 32. The connectors 59 are generally D-rings 59 which are used to couple and tie down large items in the interior of the trailer 10. Other types of connectors 59 may also be used without departing from the spirit and scope of the present invention. For example, the connectors 59 may be bike mounts for storing bikes in the interior of the trailer 10.

The interior of the trailer 10 may also have one or more light fixtures located therein. The light fixtures may be bulb fixtures, florescent, LED, or the like.

The trailer 10 will also have a plurality of power outlets 66. The power outlets 66 may be internal as well as external to the trailer 10. The power outlets 66 may be 110 volt outlets or a 12 volt power outlet in order to power different types of equipment and components.

A face shield 67 may further be coupled to the front of the trailer 10. The face shield 67 is generally coupled to a lower front section of the lid assembly 34. However, this should not be seen to limit the scope of the present invention. The face shield 67 may also be coupled to the main compartment body 24. The face shield 67 has two main purposes. First, the face shield 67 is used to make the trailer 10 more aerodynamic. The face shield 67 will reduce air drag by directing air currents over the top of the trailer 10. The face shield 67 can also be used to protect the front of the trailer 10 from damage due to bugs, stones or other debris that may be kicked up by the rear tires of the vehicle.

Figure 7:
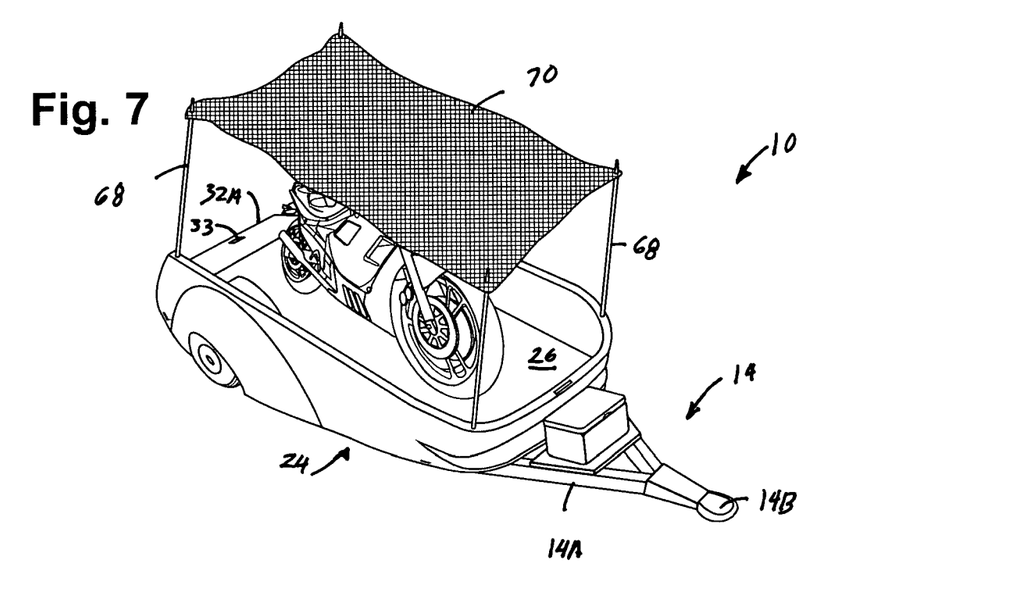
FIG. 7 is an elevated perspective view of the improved trailer with the top removed and a sun shield installed.
Figure 7A:
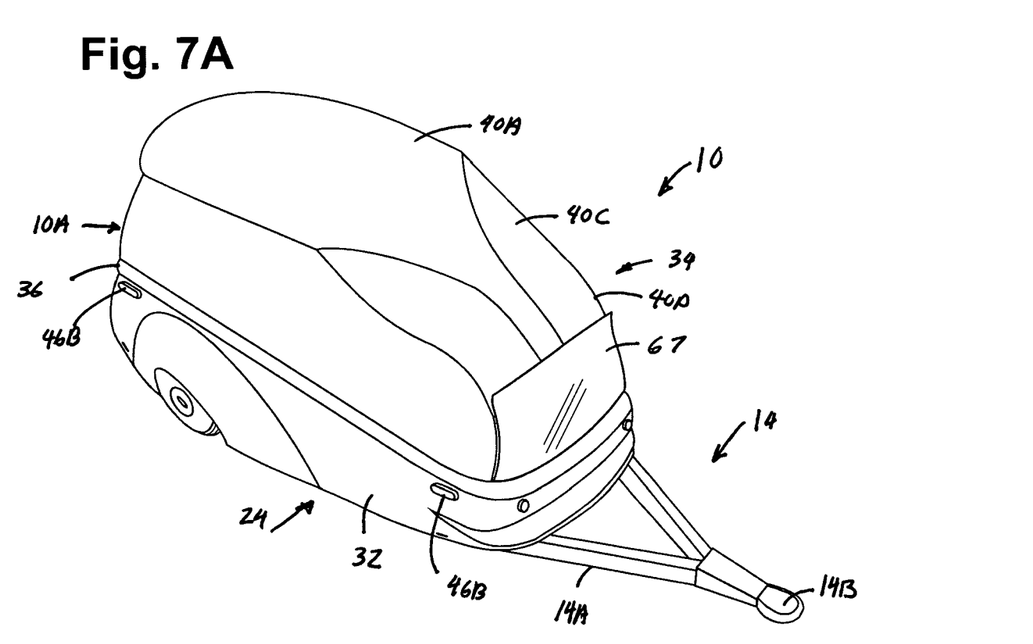
FIG. 7A is an elevated perspective view of the improved trailer with a wind/bug shield installed.

Referring now to FIG. 7, the lid assembly 34 may be completely removed from the trailer 10 to form an open top trailer 10. In a stationary position, the open top trailer 10 may be transformed into a tent. A plurality of poles 68 may be coupled to extend up from the walls 32. Awning material 70 is then coupled to the top of the poles 68. In FIG. 7, the awning material 70 is coupled to the top of each pole to form a roof over the open top trailer 10. Alternatively, the awning material 70 may be used to fully enclose the open top trailer 10 to form a tent structure.

Figure 5:
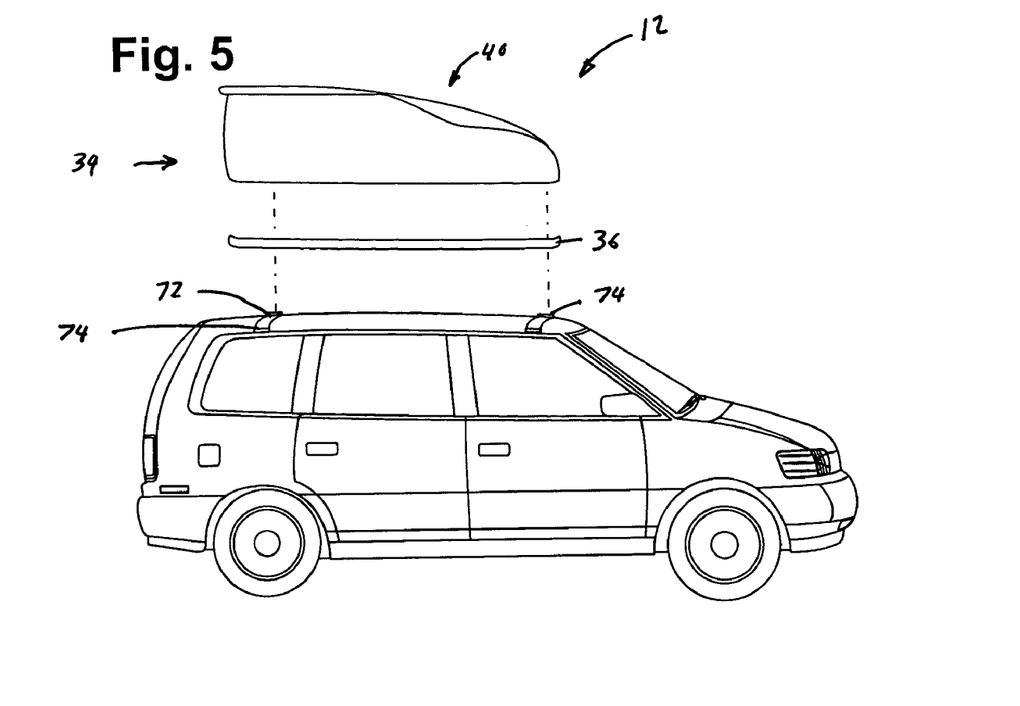
FIG. 5 is an exploded side view of a section of the improved trailer being mountable on top of a vehicle.
Figure 5A:
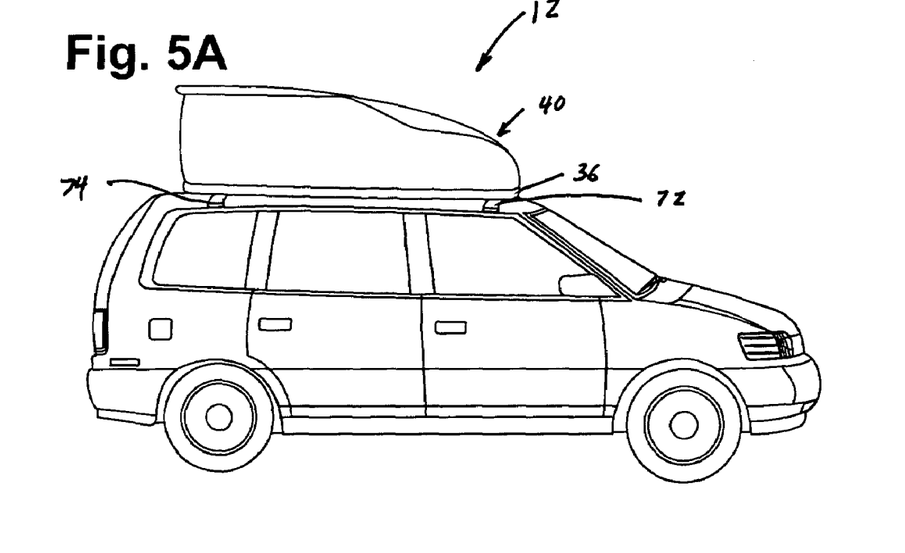
FIG. 5A is a side view of a section of the improved trailer being mountable on top of a vehicle.

As stated above, the trailer 10 may be partially disassembled so that sections of the trailer 10 may be mounted on a roof of a vehicle to form a rooftop storage container 12. As shown in FIGS. 5 and 5A, the lid assembly 34 may be removed from the trailer 10 and mounted to a roof of a vehicle. In order to mount the lid assembly 34 to the roof of the vehicle, the vehicle must have a roof top mounting rack 72. The roof top mounting rack 72 is coupled to the roof of the vehicle. The lid assembly 34 is then removably mounted to the roof top mounting rack 72. A coupling mechanism 74 is used to couple the lid assembly 34 to the roof top mounting rack 72. The coupling mechanism 74 may be latches, removably screws, or the like.

Any type of roof top mounting rack 72 may be used. The roof top mounting rack 72 will either 1) allow the lip member 36 of the lid assembly 34 to contact the roof of the vehicle to prevent items stored in the rooftop storage container 12 form falling out from underneath the rooftop storage container 12, or 2) have a base tray coupled to the rooftop storage container 12 to prevent items stored in the rooftop storage container 12 form falling out if the lip member 36 of the lid assembly 34 is raised slightly above the roof of the vehicle.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A combination trailer and rooftop carrier for transporting objects comprising:
    a frame having an axle and wheel assembly wherein the frame has a trailer hitch to couple the frame to a vehicle;
    a main storage compartment coupled to the frame and axle wheel assembly; and
    a lid assembly removably coupled to the main storage compartment wherein the lid assembly may be removed and coupled to a roof top mounting rack on a vehicle to form the rooftop carrier; wherein the lid assembly comprises:
        a lip member running along an outer perimeter and on a top surface of the main compartment body, the lip member being removably coupled to the main storage compartment and coupled to the roof top mounting rack on the vehicle; and
        a shell top hingely coupled to the lip member to raise the shell top to open and close the lid assembly.

2. The combination trailer and rooftop carrier for transporting objects in accordance with claim 1 wherein the frame comprises a plurality of a plurality of tubular members coupled to the axle assembly.

3. The combination trailer and rooftop carrier for transporting objects in accordance with claim 1 wherein the main storage compartment comprises:
    a floor board having an approximately planer surface wherein the floor board is coupled to the frame at an angle to allow a liquid to drain off the floor board; and
    a plurality of walls extending up from the outer perimeter of the floor board to form an enclosure having an open top section.

4. The combination trailer and rooftop carrier for transporting objects in accordance with claim 3 wherein a rear wall of the plurality of walls extending up from the outer perimeter of the floor board is movably coupled to the floor board to open the enclosure formed by the plurality of walls.

5. The combination trailer and rooftop carrier for transporting objects in accordance with claim 3 wherein the floor board has a pair of wheel wells extending up from the floor board to lower a profile of the trailer to make the trailer more aerodynamic.

6. The combination trailer and rooftop carrier for transporting objects in accordance with claim 3 wherein the lid assembly further comprises a pair of lift members coupled to the shell top and an interior surface of the main storage compartment for raising the shell top and preventing the shell top from free falling downward.

7. The combination trailer and rooftop carrier for transporting objects in accordance with claim 3 wherein the shell top comprises:
    a roof board having an approximately planer surface wherein a front exterior section of the roof board is angled and edges rounded to form an aerodynamic shell top; and
    a plurality of shell top walls extending down from the outer perimeter of the roof board to form an enclosure having an open bottom section, the shell top enclosure in combination with the main storage compartment enclosure forming a hollow interior section for the main compartment body having a depth to store large equipment.

8. The combination trailer and rooftop carrier for transporting objects in accordance with claim 3 further comprises:
   an entertainment control unit located in an interior surface of the main storage unit;
   a plurality of speakers coupled to an interior surface of the shell top to output audio signals from the entertainment control unit; and
   a display monitor coupled to the interior surface of the shell top to display video signals from the entertainment control unit.

9. The combination trailer and rooftop carrier for transporting objects in accordance with claim 3 further comprising a plurality of lights coupled to an exterior surface of the main storage unit to signal braking and turning of the trailer.

10. The combination trailer and rooftop carrier for transporting objects in accordance with claim 3 further comprising a plurality of ring members coupled to an top exterior surface of the shell top for tying down objects to the top exterior surface of the shell top.

11. The combination trailer and rooftop carrier for transporting objects in accordance with claim 10 further comprising a roof top rack coupled to the top exterior surface of the shell top for coupling objects to the top exterior surface of the shell top and preventing damage to the top exterior surface of the shell top.

12. The combination trailer and rooftop carrier for transporting objects in accordance with claim 3 further comprising a platform coupled to a front section of the frame for holding objects.

13. The combination trailer and rooftop carrier for transporting objects in accordance with claim 4 further comprising a retractable table member which is movably coupled to an interior section of the rear wall of the main storage compartment.

14. The combination trailer and rooftop carrier for transporting objects in accordance with claim 3 further comprising:
   a plurality of pole members coupled to the walls of the main storage compartment when the lid assembly is removed; and
   awning coupled to the pole members to provide an enclosure.

15. A combination trailer and rooftop carrier for transporting objects comprising:
   a frame having an axle and wheel assembly, wherein the frame comprises a plurality of a plurality of tubular members coupled to the axle assembly;
   a trailer hitch to couple a front section of the frame to couple the trailer to a vehicle;
   a main storage compartment coupled to the frame and axle wheel assembly, wherein the main storage compartment comprises:
      a floor board having an approximately planer surface wherein the floor board is coupled to the frame at an angle to allow a liquid to drain off the floor board; and
      a plurality of walls extending up from the outer perimeter of the floor board to form an enclosure having an open top section; and
   a lid assembly removably coupled to the main storage compartment wherein the lid assembly may be removed and coupled to a roof top mounting rack on a vehicle to form the rooftop carrier, wherein the lid assembly comprises:
      a lip member running along an outer perimeter of the main compartment body on the top of each wall, the lip member being removably coupled to each wall;
      a shell top hingely coupled to the lip member to raise the shell top to open and close the lid assembly wherein the shell top comprises:
         a roof board having an approximately planer surface wherein a front exterior section of the roof board is angled and edges rounded to form an aerodynamic shell top; and
         a plurality of shell top walls extending down from the outer perimeter of the roof board to form an enclosure having an open bottom section, the shell top enclosure in combination with the main storage compartment enclosure forming a hollow interior section for the main compartment body having a depth to store large equipment; and
      a pair of lift members coupled to the shell top and an interior surface of the main storage compartment for raising the shell top and preventing the shell top from free falling downward.

16. The combination trailer and rooftop carrier for transporting objects in accordance with claim 15 wherein a rear wall of the plurality of walls extending up from the outer perimeter of the floor board is movably coupled to the floor board to open the enclosure formed by the plurality of walls.

17. The combination trailer and rooftop carrier for transporting objects in accordance with claim 15 further comprises:
   an entertainment control unit located in an interior surface of the main storage unit;
   a plurality of speakers coupled to an interior surface of the shell top to output audio signals from the entertainment control unit; and
   a display monitor coupled to the interior surface of the shell top to display video signals from the entertainment control unit.

18. The combination trailer and rooftop carrier for transporting objects in accordance with claim 15 further comprising:
   a plurality of ring members coupled to an top exterior surface of the shell top for tying down objects to the top exterior surface of the shell top; and
   a roof top rack coupled to the top exterior surface of the shell top for coupling objects to the top exterior surface of the shell top and preventing damage to the top exterior surface of the shell top.

19. The combination trailer and rooftop carrier for transporting objects in accordance with claim 16 further comprising:
   a platform coupled to a front section of the frame for holding objects; and
   a retractable table member which is movably coupled to an interior section of the rear wall of the main storage compartment.

20. The combination trailer and rooftop carrier for transporting objects in accordance with claim 15 further comprising:
   a plurality of pole members coupled to the walls of the main storage compartment when the lid assembly is removed; and
   awning coupled to the pole members to provide an enclosure.

* * * * *